US012286105B2

(12) United States Patent
Varunjikar et al.

(10) Patent No.: US 12,286,105 B2
(45) Date of Patent: Apr. 29, 2025

(54) TORQUE BASED VEHICLE PATH PREDICTION

(71) Applicant: STEERING SOLUTIONS IP HOLDING CORPORATION, Saginaw, MI (US)

(72) Inventors: Tejas M. Varunjikar, Troy, MI (US); Jian Sheng, Madison Heights, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 950 days.

(21) Appl. No.: 16/400,800

(22) Filed: May 1, 2019

(65) Prior Publication Data
US 2020/0346642 A1  Nov. 5, 2020

(51) Int. Cl.
*B60W 30/095* (2012.01)
*B60W 40/09* (2012.01)
*B60W 50/14* (2020.01)
*G08G 1/16* (2006.01)

(52) U.S. Cl.
CPC ........ *B60W 30/0953* (2013.01); *B60W 40/09* (2013.01); *B60W 50/14* (2013.01); *G08G 1/167* (2013.01); *B60W 2050/143* (2013.01); *B60W 2050/146* (2013.01); *B60W 2510/202* (2013.01); *B60W 2540/18* (2013.01)

(58) Field of Classification Search
None
See application file for complete search history.

(56) References Cited

U.S. PATENT DOCUMENTS

| | | | | |
|---|---|---|---|---|
| 2015/0120142 A1* | 4/2015 | Park | .................... | B62D 15/025 701/41 |
| 2016/0288831 A1* | 10/2016 | Lee | .................... | B62D 6/002 |
| 2017/0267286 A1* | 9/2017 | Takamatsu | ............ | B60W 30/12 |
| 2018/0222475 A1 | 8/2018 | Andersson et al. | | |
| 2020/0064464 A1* | 2/2020 | Hiromitsu | ......... | B60W 30/0953 |

FOREIGN PATENT DOCUMENTS

| | | |
|---|---|---|
| DE | 102007027495 A1 | 12/2008 |
| DE | 102007061900 A1 | 6/2009 |
| DE | 102013000199 A1 | 7/2014 |
| KR | 20110032707 A | 3/2011 |

OTHER PUBLICATIONS

Office Action regarding corresponding DE App. No. 10 2020 111 606.3; dated Mar. 25, 2022.
Office Action regarding corresponding Chinese Application No. 2020103747233 dated Jan. 23, 2024.

* cited by examiner

*Primary Examiner* — Imran K Mustafa
(74) *Attorney, Agent, or Firm* — Dickinson Wright PLLC

(57) ABSTRACT

A steering system includes a motor, and a processor configured to perform a method. The method includes computing, by a processor, a predicted steering angle at a future time step. The method further includes determining, by the processor, a predicted vehicle-position at the future time step based on the predicted steering angle. The method further includes detecting, by the processor, a proximity to an object at the future time step based on predicted vehicle-position. The method further includes generating, by the processor, an intervention signal in response to the proximity being below a predetermined threshold.

26 Claims, 8 Drawing Sheets

TORQUE BASED VEHICLE PATH PREDICTION

BACKGROUND

Advanced driver assistance systems (ADAS) facilitate different levels of autonomous control of a vehicle. A steering system of the vehicle plays a key role in implementation of several ADAS features. For example, Lane Keeping Assist (LKA) uses lane information from a sensor, such as a camera, to provide steering torque assistance to driver using the steering system. In such cases, a steering system torque overlay can be requested by the ADAS function to discourage driver from unintentionally changing a lane.

SUMMARY

According to one or more embodiments, a method includes computing, by a processor, a predicted steering angle at a future time step. The method further includes determining, by the processor, a predicted vehicle-position at the future time step based on the predicted steering angle. The method further includes detecting, by the processor, a proximity to an object at the future time step based on predicted vehicle-position. The method further includes generating, by the processor, an intervention signal in response to the proximity being below a predetermined threshold.

According to one or more embodiments, a steering system includes a motor, and a processor configured to perform a method. The method includes computing, by the processor, a predicted steering angle at a future time step. The method further includes determining, by the processor, a predicted vehicle-position at the future time step based on the predicted steering angle. The method further includes detecting, by the processor, a proximity to an object at the future time step based on predicted vehicle-position. The method further includes generating, by the processor, an intervention signal in response to the proximity being below a predetermined threshold.

According to one or more embodiments, a computer program product comprising a memory device that has one or more computer executable instructions stored thereon, the computer executable instructions when executed by a processor cause the processor to perform a method. The method includes computing, by the processor, a predicted steering angle at a future time step. The method further includes determining, by the processor, a predicted vehicle-position at the future time step based on the predicted steering angle. The method further includes detecting, by the processor, a proximity to an object at the future time step based on predicted vehicle-position. The method further includes generating, by the processor, an intervention signal in response to the proximity being below a predetermined threshold.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
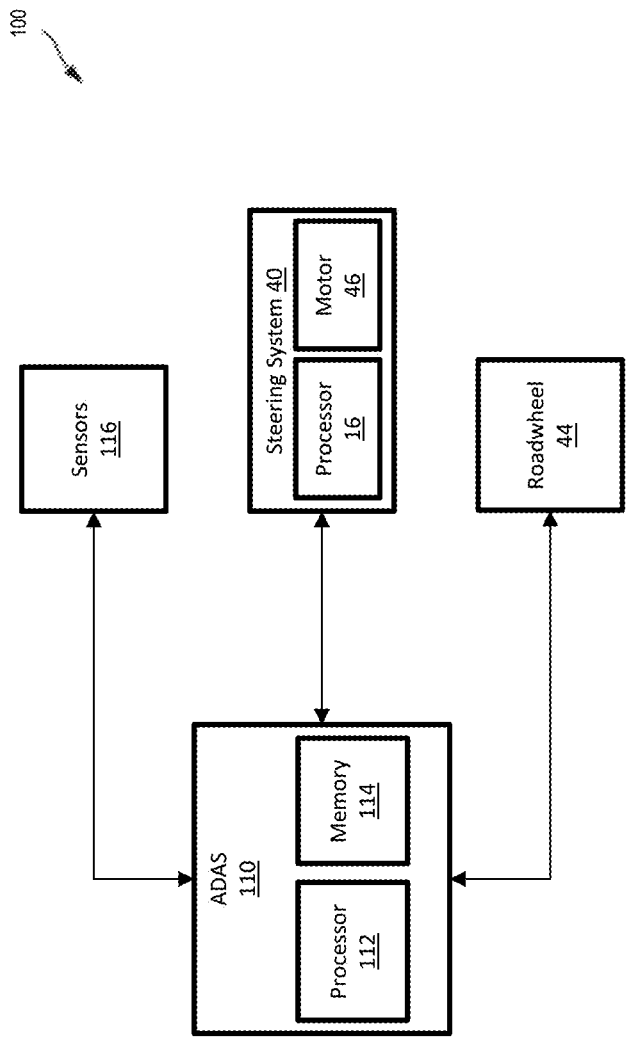
FIG. 1 depicts an automated driver assistance system in a vehicle according to one or more embodiments.

FIG. 1 depicts an advanced driver assistance system in a vehicle according to one or more embodiments. It will be appreciated that the steering system 40 shown and described can be used in an autonomous or semi-autonomous vehicle or in a more conventional vehicle. In a vehicle 100, an advanced drive assistance system (ADAS) 110 can be coupled with a steering system 40, one or more roadwheels 44 (via one or more control unit), and other control units in the vehicle 100. The ADAS 110 can include one or more processors 112 and one or more memory devices 114.

The ADAS 110 receives one or more input signals including data and/or commands from the control units, such as the controller 16 of the steering system 40. The ADAS 110 can further receive one or more input signals from one or more sensors 116, such as a camera, a radar, a lidar, or any other sensors. The ADAS 110 can further send signals including data and/or commands to the control units, such as a controller 16 of the steering system 40. The ADAS 110 can further receive input from the human driver, such as a destination, one or more preferences and the like.

The ADAS 110 can provide notifications to the driver, such as during an interaction with the driver, and/or in response to one or more conditions in the vehicle 100. The notifications can include audio notifications, visual notifications, haptic notifications, torque notifications, and the like. For example, audio/visual notifications can be sent via a driver-vehicle information unit, speakers equipped in the vehicle 100, and the like. The haptic notifications can be provided via a seat, the steering system 40, and the like. The torque notification can be sent via the steering system 40, for example by generating a torque overlay that is added into an assist torque that is generated for assisting the driver when operating the vehicle 100.

The ADAS 110, in one or more examples, determines a trajectory of travel for the vehicle 100 automatically. The sensors 116 are used to provide several ADAS features that affect lateral motion of the vehicle 100, such as lane keeping assist, lane centering assist, blind-zone assist etc. Such features can help the driver avoid collisions, such as a side-collision, front-collision etc. When providing such functionality, the ADAS 110 assesses the driver's intention, such as acceleration, lane change etc. ADAS features, such as LKA, may rely on sensor-based lane information to detect vehicle proximity to a lane-mark or vehicle's potential to cross into other lane based on lateral movement. However, such information is often delayed with respect to driver input. After the driver applies handwheel torque, there is some delay before vehicle motion is affected, due to physics. For collision avoidance application, such delay is not desirable as it might be too late to predict a potential side collision and apply necessary torque overlay.

Technical solutions described herein facilitate determining a predicted vehicle trajectory faster than sensor based trajectory prediction. For overcome the technical challenges with the sensor based vehicle trajectory prediction, the technical solutions described herein use steering signals, such handwheel torque, to predict the vehicle trajectory. The predicted trajectory (or path) can be used to identify the driver's intentions and act, if needed, to mitigate a potential collision (side, front etc.).

Figure 2:
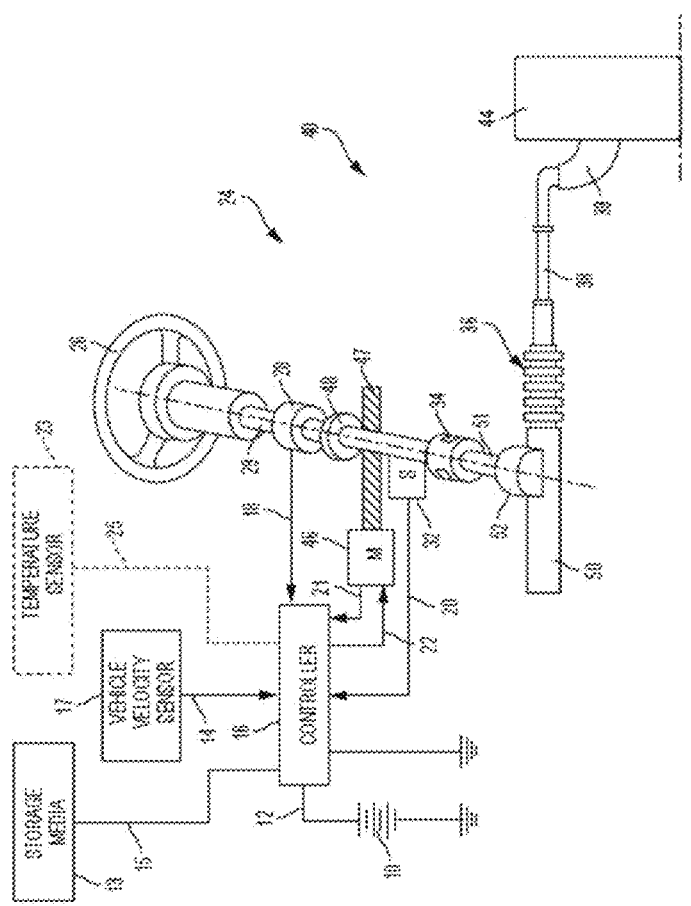
FIG. 2 depicts an EPS system according to one or more embodiments.
Figure 3:
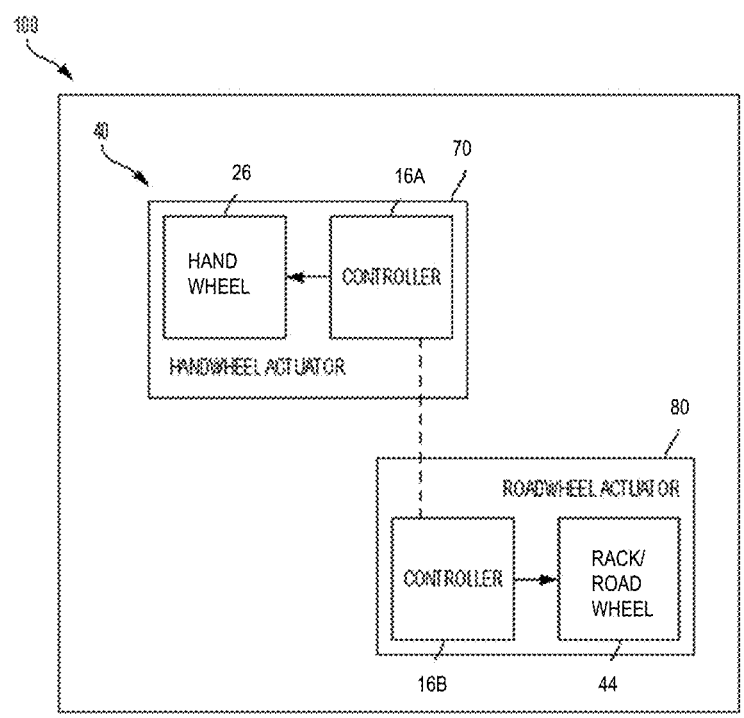
FIG. 3 is an exemplary embodiment of a SbW system 40 for implementation of the described embodiments.

The technical solutions described herein are applicable to both EPS (Electric Power Steering) and SbW (Steer-by-Wire) systems. Referring to the Figures, where the technical solutions will be described with reference to specific embodiments, without limiting same, FIG. 2 is an exemplary embodiment of an electric power steering system (EPS) 40 in a vehicle 100 suitable for implementation of the disclosed embodiments, and FIG. 3 is an exemplary embodiment of a SbW system 40 for implementation of the described embodiments. Unless specifically described otherwise, the present document refers to a steering system 40 that can be either an EPS or a SbW or any other type of steering system in which the technical solutions described herein can be used.

In FIG. 2, the steering mechanism 36 is a rack-and-pinion type system and includes a toothed rack (not shown) within housing 50 and a pinion gear (also not shown) located under gear housing 52. As the driver input, hereinafter denoted as a handwheel or steering wheel 26 is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) or tire(s) 44 (only one shown). Although a rack-and-pinion type system is described herein, the EPS in other embodiments can be a column assist EPS (CEPS), pinion assist EPS (PEPS), dual pinion assist EPS, or any other type of EPS.

Electric power steering assist is provided through the control apparatus generally designated by reference numeral 24 and includes the controller 16 and an electric motor 46, which could be a permanent magnet synchronous motor (PMSM), or a permanent magnet direct current motor (PMDC), or any other type of motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and 40 is the change in position during the sampling interval. Alternatively, motor velocity may be derived from motor position as the time rate of change of position. It will be appreciated that there are numerous well-known methodologies for performing the function of a derivative.

As the handwheel 26 is turned, torque sensor 28 senses the torque applied to the handwheel 26 by the vehicle driver. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 46 and the desired torque, the position and/or speed of the rotor and the torque applied by a driver are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 may be located at the electric motor 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics. The controller 16 uses control methods to generate a motor torque command that is sent to the motor 46. The motor 46 in accordance with this command, produces a motor torque.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

FIG. 3 depicts an exemplary SbW system according to one or more embodiments. The SbW system 40 includes a handwheel actuator (HWA) 70 and a roadwheel actuator (RWA) 80. The controller 16 is split into two blocks, a controller 16A and a controller 16B associated with the HWA 70 and the RWA 80 respectively. In other examples, the controller 16 can be distributed in any other manner.

The HWA 70 includes one or more mechanical components, such as the handwheel 26 (steering wheel), a steering column, a motor/inverter attached to the steering column either through a gear mechanism or a direct drive system. The HWA 70 further includes the microcontroller 16A that controls the operation of the mechanical components. The microcontroller 16A receives and/or generates torque via the one or more mechanical components. For example, the microcontroller 16A can send a torque command request to a motor/inverter that will generate such torque.

The RWA 80 includes one or more mechanical components, such as a steering rack coupled to a motor/inverter through a ball-nut/ball-screw (gear) or pinion gear arrangement, and the rack is connected to the vehicle roadwheels/tires 44 through tie-rods. The RWA 80 includes the microcontroller 16B that controls the operation of the mechanical components. The microcontroller 16B receives and/or generates torque via the one or more mechanical components. For example, the microcontroller 16B can send a torque command request to a motor/inverter that will generate such torque.

The microcontrollers 16A and 16B are coupled through electrical connections that allow signals to be transmitted/received. As referred to herein, a controller can include a combination of the HWA controller 16A and the RWA controller 16B, or any one of the specific microcontrollers.

In one or more examples, the controllers 12 and 16B SbW system 40 communicate with each other through CAN interface (or other similar digital communication protocols). Guidance of the vehicle 100 that is fitted with the SbW system 40 is performed by use of the steering gear. The RWA 80 receives an electronic communication signal of rotation of the steering wheel by the driver. A driver controls the steering wheel to directionally control the vehicle 100. The angle from HWA 70 is sent to the RWA 80 which performs position control to control rack travel to guide the roadwheel. However, due to the lack of mechanical connection between the steering wheel and the road wheels, the driver is not readily provided with a feel for the road without torque feedback (unlike the case in an EPS as described earlier).

In one or more examples, the HWA 70 that is coupled to the steering column and steering wheel simulates the driver's feel of the road. The HWA 70 may apply tactile feedback in the form of torque to the steering wheel. The HWA 70 receives a rack force signal from the RWA 80 to generate an appropriate torque feel for the driver. Alternatively, the handwheel angle and vehicle speed can also be used to generate desired torque feel to the driver.

As noted earlier, the SbW and EPS described herein are exemplary, and the technical solutions described herein are applicable to any type of a steering system, and as such, unless specifically mentioned otherwise, a "steering system 40" herein refers to any type of steering system.

Figure 4:
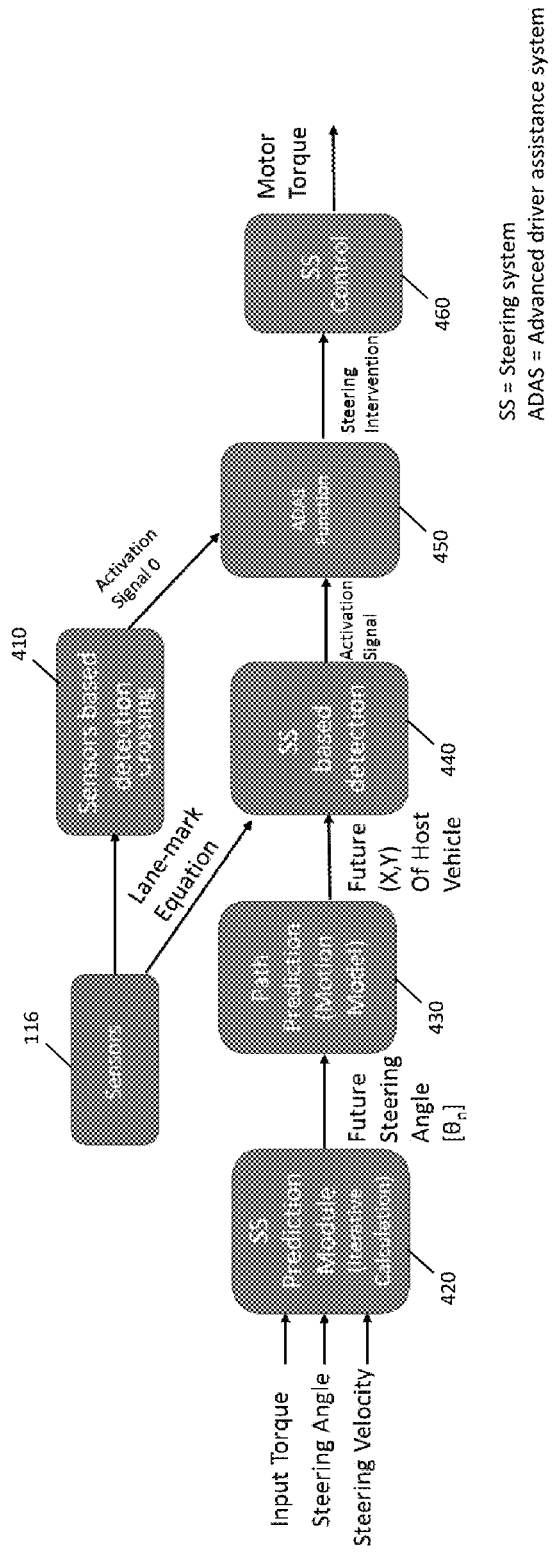
FIG. 4 depicts a block diagram depicting torque based vehicle path prediction according to one or more embodiments.

FIG. 4 depicts a block diagram depicting torque based vehicle path prediction according to one or more embodiments. The blocks that are depicted can be functions that are implemented by one of the processors, such as the processor 112 and/or can be implemented as a module that receives input data and outputs results to the one or more processors. For example, the functions can be implemented using computer executable instructions.

The vehicle path prediction system 200 that is depicted includes, among other components, a steering system (SS) prediction module 420, a path prediction module 430, an SS based detection module 440, an ADAS functions module 450, and an SS function controller 460. The vehicle path prediction system 200 includes/uses sensors 116, such as camera, RADAR, LIDAR, and the like, that provide input signals to the one or more components.

In one or more examples, the vehicle path prediction system 200 can further include a sensor-based detection module 410. The sensors based detection module 410 uses input signals only from one or more sensors 116, such as a camera, Both detection modules, the sensor based detection module 410 and the SS based detection module 440, detect a proximity of the vehicle 100 to an object. For example, the object can include a lane-marking, a traffic marker (e.g. traffic cone), another vehicle, a railing, a wall, a tree, a pedestrian, or any other object that the vehicle 100 can collide with. In the examples described herein, the 'detection' is described for checking if the vehicle is crossing a predetermined boundary, such as lane-marking information, however, it is understood that the proximity to any other object can be determined and used by the technical solutions described herein. The detection is done, typically, in vehicle's coordinates. This detection result information can be used by the ADAS functions module 450 to determine proximity to a lane-mark or potential of lane crossing. Output of the one or both detection modules 410, 440 can be further used as an activation signal to the ADAS functions module 450.

Using a mathematical model of dynamics of the steering system 40, the SS prediction module 420 predicts a steering angle for a future time step. The prediction is based on an input torque (T), a present steering angle (θ), and a present steering velocity (speed at which steering angle is changed). In one or more examples, the steering velocity is derived from measured motor velocity. The input torque (T) can either represent an input from the driver (driver torque or handwheel torque) or the motor torque (such as command sent to electric motor 46). The steering velocity can be dynamically computed based on the steering angle at multiple time points.

The dynamics of the steering system 40 can be represented by either a single inertia model or a multi-body model. A single-inertia model can be used to represent the dynamics of the steering system 40 in following second order discrete transfer function form:

$$\frac{\theta}{T} = \frac{a0 + a1 \cdot z^{-1} + a2 \cdot z^{-2}}{b0 + b1 \cdot z^{-1} + b2 \cdot z^{-2}}$$

where θ is steering angle, T is input torque (i.e. handwheel torque or driver torque) to the steering system 40, a's and b's are coefficients of discrete transfer function obtained by approximating system dynamics and steering system control. An appropriate sample time is chosen for above equation depending on dynamic behavior of the system. In the above equation, $z^{-p}$ represents delay of p sample time steps. In case of a multi-body or multiple-inertia model, the order of the transfer function increases. A person skilled in art may also use nonlinear function to obtain steering angle as a function of input torque and/or other signals.

Above equation can also be written in a different form:

$$\theta[k] = \frac{1}{b0} * (a0 * T[k] + a1 * T[k-1] + a2 * [k-2] - b1 * \theta[k-1] - b2 * \theta[k-2])$$

where, k represents current ($k^{th}$) time step; k−1 is previous time step which was 1 sample time ago, . . . k−p is time step that was p sample time ago, etc.

Figure 5:
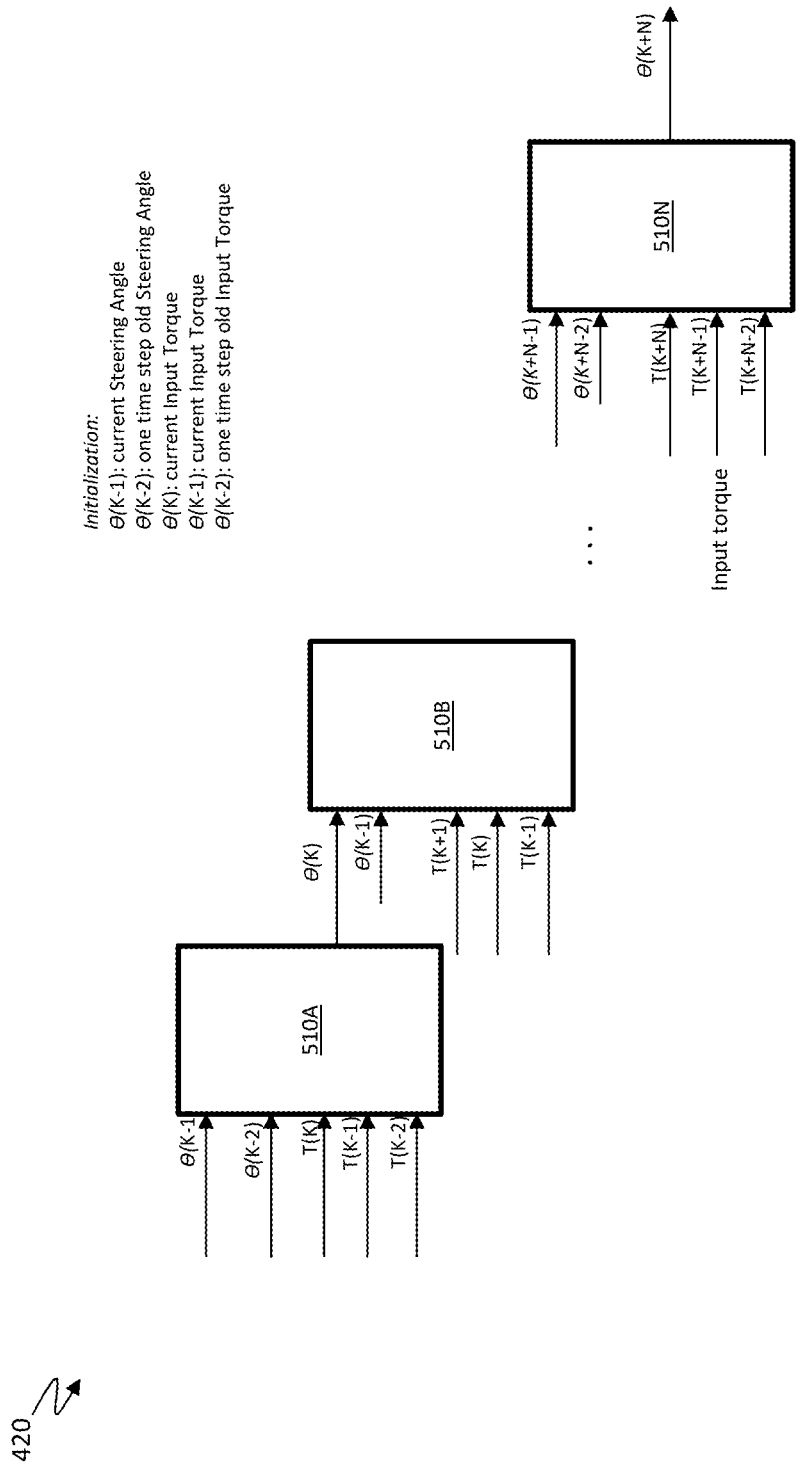
FIG. 5 depicts an example structure of a steering system prediction module according to one or more embodiments.

FIG. 5 depicts an example structure of a steering system prediction module according to one or more embodiments. Each block 510 depicted in FIG. 5 performs a calculation of the above equation for θ[k], where the value of k is different for each block. In this calculation, the input torque (T) is assumed constant (i.e. present measured value), and the above equation is applied multiple times (say N times) to obtain steering angle prediction after N time steps in future.

As shown, output of a first predictor block 510A, which is a predicted steering angle at time K, is used as an input to a second predictor block 510B. The second predictor block outputs a predicted steering at time K+1, and this output is used as an input to a subsequent predictor block (not shown). This sequence is continued for N steps to predict a steering angle at K+N. Each predictor block 510A, 510B . . . 510N uses the same input torque values for the calculation. It should be noted that in some examples, the input torque can also be predicted and such predicted values used at corresponding steering angle predictions. Furthermore, the choice of number of steps, N, as well as step size depends on dynamics of the system. As depicted in the FIG. 5, values of T are constant starting from step K to K+N, and value at K is the measured value; for θ the value until inputs to 510A are calculated earlier, and starting from step K to K+N are the estimations being made dynamically.

Referring back to FIG. 4, the path prediction module 430 uses the predicted steering angle from the SS prediction module 420 to calculate future position of the vehicle 100. The steering angle can be converted to a tire angle (δ) using steering ratio or other methods. In one or more examples, a kinematic vehicle motion model is used for position prediction. Alternatively, in other examples a dynamic vehicle model can be used to predict the vehicle position based on the predicted steering angle. A constant turning radius model is used. Based on the future steering/tire angle, position of the vehicle 100 can be predicted over the multiple time steps corresponding to time steps n used for prediction of the steering angle.

Following equations represent calculations that can be performed to predict the vehicle position, specifically X & Y coordinates of vehicle's center or gravity (CG) as well as front left and right corners:

Radius=L/δ

ε=U×t*/Radius x_path_cg=Radius*sin(ε)

y_path_cg=sgn*Radius*(1−cos(ε))

x_path_leftCorner=x_path_cg+a*cos(ε)−width/2*sin(ε)

y_path_leftCorner=y_path_cg(a*sin(ε)+width/2*cos(ε))

x_path_rightCorner=x_path_cg+(a*cos(ε)−width/2*sin(ε))

y_path_rightCorner=y_path_cg+(a*sin(ε)+width/2*cos(ε))

In the above equations, Radius=radius of vehicle path, L=vehicle wheel-base, t*=look-ahead distance, U=vehicle speed, ε=arc angle of predicted vehicle path, and width=vehicle width.

The SS based detection module 440 uses the vehicle's future position and lane-mark information to check if the vehicle's left or right corner is crossing lane-markings. The lane-markings can be obtained from the sensors 116, such as the camera. It should be noted that although lane-markings are used to describe the crossing detection in one or more embodiments of the technical solutions described herein, in other embodiments the detection modules 410 and 440, can use other predetermined landmarks. For example, other landmarks that can be used include other vehicles, road edge, stationary objects, pedestrians, and the like.

Figure 6:
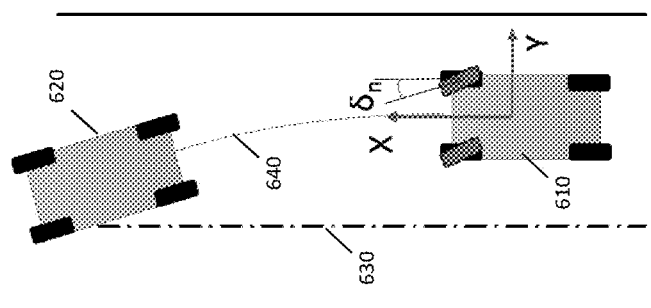
FIG. 6 depicts a visual depiction of the lane-marking detection using the predicted vehicle positions according to one or more embodiments.

FIG. 6 depicts a visual depiction of the lane-marking detection using the predicted vehicle positions according to one or more embodiments. When the vehicle 100 is in position 610, the trajectory 640 of the vehicle is predicted by computing the vehicle positions at the n time steps. The tire angle at time step n, corresponding to steering angle computations described in FIG. 5, is shown as $\delta_n$ in FIG. 6. One of the predicted vehicle positions includes the position 620. In conjunction, the sensors 116 are used to detect the lane markings 630. It can be checked mathematically whether the vehicle 100 crosses the lane markings 630 by converting the equation of the lane-marks 630 in vehicle coordinates and by using the (x, y) coordinates of left and right vehicle corners of the vehicle 100 from equations mentioned above.

If the SS based detection module 440 detects lane-crossing, the activation signal is sent to the ADAS function 460, and the activation signal indicating that the vehicle position 620 can cause a lane-crossing. In one or more examples, to make detection more robust following conditions can be checked to set the activation signal to true: both front vehicle corners' predicted position cross left/right lane-mark, and one front vehicle corner position crosses left/right lane-mark AND current vehicle center distance to left/right lane-mark is less than a threshold. Other conditions can also be used in one or more examples.

As noted earlier, the sensors based detection module 410 can, in addition, perform the lane-crossing detection. The sensor based detection module 410 can also use the camera sensor signals for the lane-mark information in the vehicle's coordinates. This information is used by the sensors based detection module 410 to determine proximity of the vehicle's predicted position 620 to a lane-mark 630 for potential of lane crossing. Output of the sensors based detection module 410 can be a second activation signal provided to the ADAS function module 450.

The ADAS function module 450 depicts any one or more of the ADAS provided features, which may be implemented by the processor 112 of the ADAS system 110. Alternatively, or in addition, the feature(s) may be implemented by one or more separate modules of the ADAS 110. For example, the ADAS function 450 can be a lane-keeping assistance function or a side-collision avoidance assistance function. The ADAS function 450 uses the activation signals along with other information (such as position and velocity of target vehicle in other lane or time to collision (TTC) etc.) to generate a steering intervention signal. The intervention signal can be an input/output torque overlay or position control signal or assist scaling factor, or any other such signal that changes the driver's maneuver that is causing the trajectory of the vehicle 100 towards the predicted position 620. In one or more examples, the intervention signal at least causes a notification to the driver that the ADAS 110 is recommending not to maneuver the vehicle 100 along the predicted vehicle trajectory 640 that leads to the predicted position 620.

Figure 7:
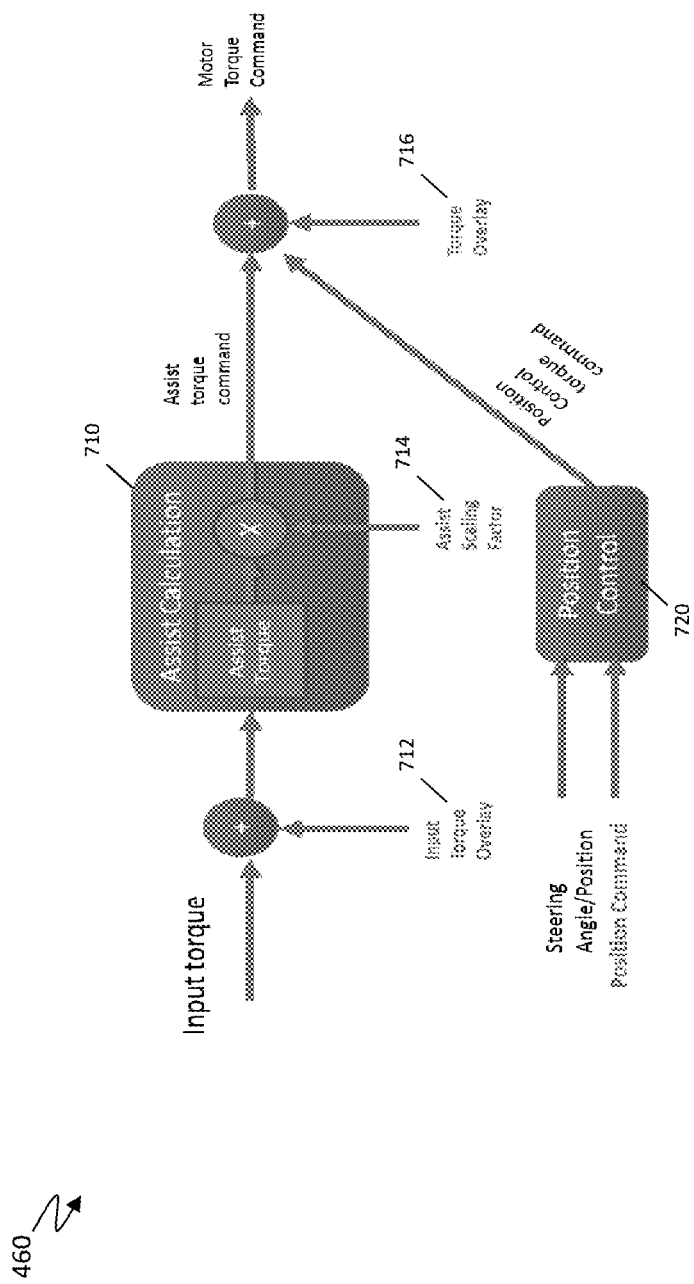
FIG. 7 depicts a block diagram of a steering system control module according to one or more embodiments.

FIG. 7 depicts a block diagram of a steering system control module according to one or more embodiments. The steering system module 450, among other components, includes the modules assist torque calculator 710, and position controller 720. The assist torque calculator 710 computes an amount of assist torque to provide the driver's maneuver based on an input torque provided by the driver. The intervention signal can be used as an input overlay torque 712 that adjusts the input torque that is provided by the driver. For example, the input overlay torque 712 can increase/decrease the input torque value that is used to compute the amount of assist torque to be generated by the motor 46. In one or more examples, the intervention signal can be used as an input to a lookup table to determine the input overlay torque 712.

Alternatively, or in addition, the intervention signal is used as a scaling factor 714 that adjusts the amount of assist torque that is calculated by the assist torque calculator 710. Alternatively, the intervention signal is used as an input to a lookup table to determine the scaling factor 714. The scaling factor 714 can increase/decrease the amount of assist torque that is calculated. In one or more examples, the scaling factor 714 is used as a multiplier to adjust the calculated amount of assist torque. The amount of assist torque, after the adjustment(s), is used to generate an assist torque command that is applied to the motor 46 to generate the corresponding assist torque.

In one or more examples, the intervention signal can be used as an output overlay torque command 716 that is blended into the assist torque command that is generated by the assist torque calculator 710.

Further yet, the intervention signal can be used as a position command 722 to the position controller 720. The position controller 720 generates a position torque command to adjust the position of the steering wheel 26. The position torque command is applied to the motor 46 to generate the corresponding amount of position torque that adjusts the position of the steering wheel 26. By applying the additional position command 722, the intervention signal changes the position of the steering wheel 26 from a desired position to which the driver is moving the steering wheel 26. In one or more examples, the intervention signal can be used as the position command 722 itself, or the intervention signal can be used as an input to a lookup table that provides the position command.

The activation signal calculation and the consequent intervention signal calculation and usage as described herein improves the performance of the ADAS 110. For example, compared to activation signal calculation based solely on signals from sensors 116 (e.g. camera), using the input torque to calculate predicted steering angle and activation signal has a faster response time during tests performed. Further, tests for comparison of lane crossing activation based on only sensors 116 (e.g. camera) to activation based on only torque-based method were performed. The lane crossing detection using the torque-based method was found to be faster. Such a lead time due to use of input torque as well as steering angle is an improvement over sensor-only activation signal generation because ADAS functions such as lane-keep or lane-centering may not update their outputs quickly for a quick yaw rate change event in case of the sensor-only systems. In such case steering-based technical solutions described herein can improve performance of the above mentioned ADAS functions and further can also be used for ADAS functions such as side-collision avoidance.

Figure 8:
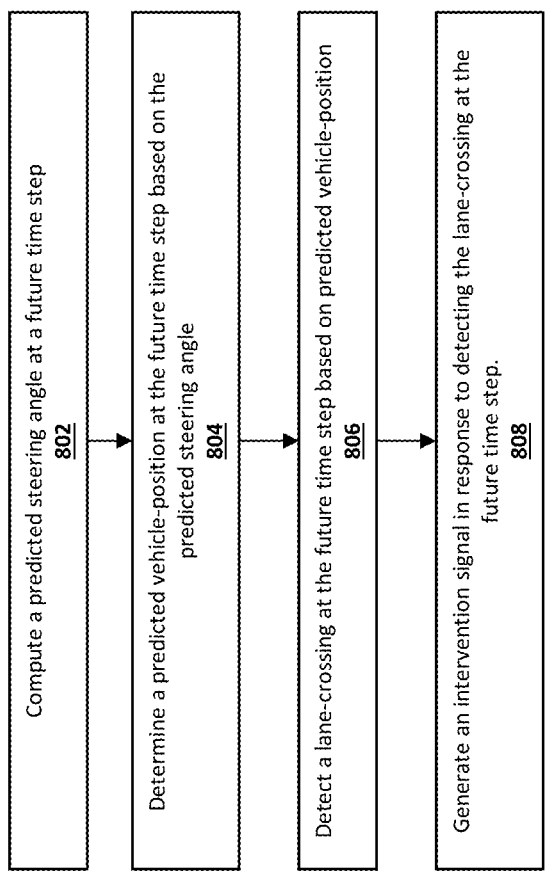
FIG. 8 depicts a flowchart of an example method for torque based vehicle trajectory prediction according to one or more embodiments.

FIG. 8 depicts a flowchart of an example method for torque based vehicle trajectory prediction according to one or more embodiments. The method can be implemented by one or more processors in the vehicle 100. In one or more examples, the processors are associated with the steering system 40 to send/receive steering signals and torque commands. The method includes computing a predicted steering angle at a future time step t+k, where t is the present time step, at 802. As described herein, the steering system prediction module 420 can predict the steering angle based on the input torque, steering velocity, and present steering angle.

The method further includes determining a predicted vehicle-position (620) at the future time step (t+k) based on the predicted steering angle, at 804. The path prediction module 430 can predict the future vehicle-position 620 using the vehicle model as described herein.

The sensor based detection module 440 detects a lane-crossing at the future time step based on the predicted vehicle-position, at 806. The prediction uses lane-marking information that is received from the sensors 116, such as a camera. The detection is performed by checking if the predicted vehicle position crosses the lane marking coordinates. In one or more examples, the lane marking coordinates are converted into the vehicle coordinates for performing the check. Alternatively, the coordinates of the vehicle are converted to the lane marking coordinates. Other conversions are also possible.

If a (potential) lane crossing is detected at the future time step an intervention signal is generated by the ADAS function module 450, at 808. The intervention signal is provided to the steering control module 460. The intervention signal can be used in one or more ways by the steering control module 460 to provide a notification to the driver and/or alter the maneuver being performed by the driver with the steering wheel 26. For example, the intervention signal can be used to generate an audio/visual signal to the driver. Alternatively, or in addition, an overlay torque may be generated that is added into the input torque received from the driver. In one or more examples, the overlay torque may be added into the assist torque command that is generated based on the input torque from the driver. In yet other examples, the overlay torque is added into a final torque command that is being applied to the motor 46. The final torque command, in one or more examples, can be an addition of the assist torque and a position torque command. The position torque command can be generated based on an input signal to change the angle of the steering wheel 26. In yet other examples, the intervention signal is used to alter the position torque command itself by generating a position command that is added to the input steering angle signal.

Accordingly, the technical solutions described herein facilitate using steering signals (torque, angle) to predict vehicle position over a predetermined duration (or driver intention). The technical solutions described herein facilitate using a steering model to predict future steering angle based on steering torque. Further, a vehicle model is used to predict future vehicle path based on predicted future steering angle, and vehicle position. The technical solutions described herein further use the predicted vehicle position to identify lateral vehicle movement. The predicted vehicle position is further used to calculate an activation signal based on possibility of lane crossing. The lane crossing detection is further based on sensor based lane information along with the predicted vehicle position to calculate the activation signal. The activation signal leads to generating a steering intervention signal, which causes modification of steering motor torque. For example, the steering intervention signal can be used for modifying steering torque using input torque overlay/output torque overlay/position command/assist scaling factor. In one or more examples, the steering intervention signal is also used for generating an audio/visual warning.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A method comprising:
   computing, by a processor, a predicted steering angle at a future time step, wherein the predicted steering angle is computed based on a measured input torque value applied by a driver to a handwheel, a steering velocity, and a present steering angle;
   determining, by the processor, a predicted vehicle-position at the future time step based on the predicted steering angle;
   detecting, by the processor, a proximity to an object at the future time step based on the predicted vehicle-position; and generating, by the processor, an intervention signal in response to the proximity being below a predetermined threshold.

2. The method of claim 1, wherein the future time step is t+k, t being the present time, and k being a predetermined integer.

3. The method of claim 1, wherein the intervention signal is an overlay torque command that is added to an input torque to a steering system.

4. The method of claim 1, wherein the intervention signal is a scaling factor that is used to scale an input torque to a steering system.

5. The method of claim 1, wherein the intervention signal is a position command that is added to an input steering angle provided to a steering system.

6. The method of claim 1, wherein the intervention signal is a torque command that is added to an assist torque command computed by a steering system.

7. The method of claim 6, further comprising:
computing, by a motor control system of a steering system, an assist torque command to generate a corresponding assist torque using a motor;
computing, by the motor control system, a position control torque command to position a steering wheel of the steering system; and
generating, by the motor control system, a final torque command by adding the assist torque command, the position control torque command, and an overlay torque command corresponding to the intervention signal.

8. The method of claim 1, further comprising:
generating an audio-visual notification corresponding to the intervention signal.

9. The method of claim 1, wherein detecting the proximity to the object at the future time step based on predicted vehicle-position comprises detecting a lane-crossing at the future time step.

10. The method of claim 9, wherein detecting the lane-crossing further comprises:
receiving, by the processor, lane-marking coordinates from a sensor; and
detecting, by the processor, that the predicted vehicle-position crosses the lane-marking coordinates.

11. A steering system comprising:
a motor; and
a processor configured to perform a method comprising:
determining a predicted steering angle at a future time step, wherein the predicted steering angle is determined based on a measured input torque value applied by a driver to a handwheel, a steering velocity, and a present steering angle;
computing a predicted vehicle-position at the future time step based on the predicted steering angle;
detecting, by the processor, a proximity to an object at the future time step based on the predicted vehicle-position; and
generating, by the processor, an intervention signal in response to the proximity being below a predetermined threshold.

12. The steering system of claim 11, wherein the intervention signal is an overlay torque command that is added to an input torque to the steering system.

13. The steering system of claim 11, wherein the intervention signal is a scaling factor that is used to scale an input torque to a steering system.

14. The steering system of claim 11, wherein the intervention signal is a position command that is added to an input steering angle provided to the steering system.

15. The steering system of claim 11, wherein the intervention signal is a torque command that is added to an assist torque command computed by the steering system.

16. The steering system of claim 15, further comprising:
computing, by a motor control system of a steering system, an assist torque command to generate a corresponding assist torque using a motor;
computing, by the motor control system, a position control torque command to position a steering wheel of the steering system; and
generating, by the motor control system, a final torque command by adding the assist torque command, the position control torque command, and an overlay torque command corresponding to the intervention signal.

17. The steering system of claim 11, further comprising:
generating an audio-visual notification corresponding to the intervention signal.

18. The steering system of claim 11, wherein detecting the proximity to the object at the future time step based on predicted vehicle-position comprises detecting a lane-crossing at the future time step.

19. A computer program product comprising a memory device that has one or more computer executable instructions stored thereon, the computer executable instructions when executed by a processor cause the processor to perform a method, the method comprising:
determining a predicted steering angle at a future time step, wherein the predicted steering angle is determined based on a measured input torque value applied by a driver to a handwheel, a steering velocity, and a present steering angle;
computing a predicted vehicle-position at the future time step based on the predicted steering angle;
detecting, by the processor, a proximity to an object at the future time step based on the predicted vehicle-position; and
generating, by the processor, an intervention signal in response to the proximity being below a predetermined threshold.

20. The computer program product of claim 19, wherein the intervention signal is an overlay torque command that is added to an input torque to a steering system.

21. The computer program product of claim 19, wherein the intervention signal is a scaling factor that is used to scale an input torque to a steering system.

22. The computer program product of claim 19, wherein the intervention signal is a position command that is added to an input steering angle provided to a steering system.

23. The computer program product of claim 19, wherein the intervention signal is a torque command that is added to an assist torque command computed by a steering system.

24. The computer program product of claim 23, further comprising:
computing, by a motor control system of a steering system, an assist torque command to generate a corresponding assist torque using a motor;
computing, by the motor control system, a position control torque command to position a steering wheel of the steering system; and
generating, by the motor control system, a final torque command by adding the assist torque command, the position control torque command, and an overlay torque command corresponding to the intervention signal.

25. The computer program product of claim 19, further comprising:
generating an audio-visual notification corresponding to the intervention signal.

26. The computer program product of claim 19, wherein detecting the proximity to the object at the future time step based on predicted vehicle-position comprises detecting a lane-crossing at the future time step.

* * * * *